United States Patent
Bai et al.

(10) Patent No.: US 6,928,772 B2
(45) Date of Patent: Aug. 16, 2005

(54) METHOD AND APPARATUS FOR GROWING VINE CROPS IN A GREENHOUSE

(76) Inventors: Lena Li Bai, 48500 Amber Lane Dr., Shelby Township, MI (US) 48315; Litang Gao, 48500 Amber Lane Dr., Shelby Township, MI (US) 48315

( * ) Notice: Subject to any disclaimer, the term of this patent is extended or adjusted under 35 U.S.C. 154(b) by 0 days.

(21) Appl. No.: 10/653,392

(22) Filed: Sep. 2, 2003

(65) Prior Publication Data

US 2005/0044785 A1 Mar. 3, 2005

(51) Int. Cl.$^7$ .......................... A01G 17/04; A01G 31/04
(52) U.S. Cl. ........................................ 47/62 R; 47/46
(58) Field of Search ................. 47/59 R, 62 R, 47/62 C, 62 E, 62 N, 18, 46, 47

(56) References Cited

U.S. PATENT DOCUMENTS

| | | | | |
|---|---|---|---|---|
| 3,667,157 A | * | 6/1972 | Longhini | 47/59 R |
| 5,856,190 A | * | 1/1999 | Iwai et al. | 435/420 |
| 6,219,966 B1 | * | 4/2001 | Lapointe et al. | 47/62 C |
| 6,374,537 B1 | * | 4/2002 | Van Wingerden et al. | 47/17 |
| 6,598,339 B1 | * | 7/2003 | Bish et al. | 47/59 R |

FOREIGN PATENT DOCUMENTS

| | | | | |
|---|---|---|---|---|
| EP | 1310157 A1 | * | 5/2003 | A01G/9/12 |
| FR | 2819681 A1 | * | 7/2002 | A01G/9/12 |
| GB | 1587546 | * | 4/1981 | A01G/9/12 |
| JP | 404365430 A | * | 12/1992 | A01G/9/12 |
| JP | 2001016993 A | * | 1/2001 | A01G/9/12 |
| JP | 2001231373 A | * | 8/2001 | A01G/9/12 |
| JP | 2001275496 A | * | 10/2001 | A01G/9/12 |
| JP | 3415531 B2 | * | 6/2003 | A01G/1/00 |

* cited by examiner

*Primary Examiner*—Son T. Nguyen (57) ABSTRACT

An apparatus for growing vine crops in a greenhouse comprises a first media carrier, a first nutrient supply means, a first support means, a regulating mechanism, a main cable, a plurality of load differential mechanisms, a second media carrier, a second nutrient supply means, and a second support means. The second media carrier is above and in substantial parallel with the first media carrier. The distance between the first media carrier and second media carrier is adjusted by the regulating mechanism. A method for growing vine crops in a greenhouse comprises two growing modes: a single crop growing mode, and a vertical dual crop growing mode. The sequence of this process begins with a first single crop growing mode, followed by a vertical dual crop growing mode, and then followed by a second single crop growing mode. A single crop growing mode: first crops grow in the first media carrier fed by the first nutrient supply means, trained by the first support means. A vertical dual crop growing mode: the first crops grow in the first media carrier fed by the first nutrient supply means trained by the first support means; and second crops grow in the second media carrier above the first media carrier fed by the second nutrient supply means and trained by the second support means.

5 Claims, 12 Drawing Sheets

METHOD AND APPARATUS FOR GROWING VINE CROPS IN A GREENHOUSE

BACKGROUND OF THE INVENTION

This invention relates to the art of horticulture, more particularly, to a method and apparatus for growing vine crops in a greenhouse.

This invention is applicable to the growing of vine crops such as tomatoes, peppers, eggplants, cucumbers, and the like in a greenhouse. However, the invention is disclosed in details using tomatoes as an example. The invention may also be applicable to short crops as well.

Conventional tomato crop growing methods generally utilize either a one crop growing method or a two crop growing method. In the one crop growing method, crops are set in a greenhouse in about the first week of January, and are harvested from the middle of March to the end of November if the plants are healthy. The remnants of the crops are then removed, and the greenhouse is cleaned and made ready for the next season. In the two crop growing method, the spring crops are set in a greenhouse in about the first week of January, and are harvested from the middle of March to the middle of July; the fall crops are set in the greenhouse in about the first week of August, and are harvested from the beginning of October to the middle of December.

In both growing methods, only one generation of crops are utilizing the growing media on the ground and the space above it at one time. The new generation is planted after the previous generation has been removed. There is a cleaning up period of 3 to 4 weeks between the previous generation and the new generation. After which the crops of the new generation have a growing-up period which can last 2–2.5 months before their first fruits ripen. Capital investment on a greenhouse, as well as operating expenses such as heating, cooling, and other utilities still need to be paid while the grower has no yield and thus no income for each 2–3 months for each crop-change period.

Another conventional greenhouse crop growing method is inter-planting. At a predetermined time, which is usually about 3–4 weeks before harvest ends, new young crops are planted in between the old crops. These new crops grow in the inter-spaces between the old crops and may share the same growing media with the old crops. The new crops grow taller as the fruits on the old crops ripen and are harvested. Finally as the life of the old crops ends, their stems are trimmed down and cleaned up. The new crops then grow by themselves.

This method has many disadvantages as well. The new crops can be contaminated from the sharing of the growing media with the old crops. The growing media carrier cannot be cleaned after the old crops are removed due to the presence of the new crops, resulting in increased contamination. The irrigation pipelines shared by the old and new crops are not cleaned, resulting in another source of contamination. The new crops may be covered or shaded by the old crops. Also the old crops may physically touch the new crops and therefore have a greater chance of spreading any diseases they carry to the new crops. The new and old crops may be tangled together making the clean up of the old crops difficult, introducing both expense and the risk of damaging the new crops in the untangling process.

What is needed is a method and apparatus that enables the continuation of crop growth and harvest all year around. What is needed is a method and apparatus having clearly defined growing space for both old and new crops. What is needed is a method and apparatus having a clean growing media carrier for the new crops to prevent contamination. What is needed is a method and apparatus having a new growing media for the new crops to prevent contamination. What is needed is a method and apparatus having new irrigation pipelines for the new crops to prevent contamination. The present invention meets these needs.

BRIEF SUMMARY OF THE INVENTION

The primary aspect of the invention is to provide a method and apparatus that enables the continuation of crop growth and harvest all year around.

Another aspect of the invention is to provide a method and apparatus having clearly defined growing spaces for both the old and new crops.

Another aspect of the invention is to provide a method and apparatus having a clean growing media carrier for the new crops to prevent contamination.

Another aspect of the invention is to provide a method and apparatus having a new growing media for the new crops to prevent contamination.

Another aspect of the invention is to provide a method and apparatus having new irrigation pipelines for the new crops to prevent contamination.

The present invention provides a great opportunity for significantly higher crop yields and maximizes market value for growers.

An apparatus for growing vine crops in a greenhouse comprises a first media carrier, a first nutrient supply means, a first support means, a regulating mechanism, a main cable, a plurality of load differential mechanisms, a second media carrier, a second nutrient supply means, and a second support means. The second media carrier is above and in substantial parallel with the first media carrier. The distance between the first media carrier and second media carrier is adjusted by the regulating mechanism.

A method for growing vine crops in a greenhouse comprises two growing modes: a single crop growing mode, and a vertical dual crop growing mode. The sequence of this process begins with a first single crop growing mode, followed by a vertical dual crop growing mode, and then followed by a second single crop growing mode. A single crop growing mode: first crops grow in the first media carrier fed by the first nutrient supply means, trained by the first support means. A vertical dual crop growing mode: the first crops grow in the first media carrier fed by the first nutrient supply means trained by the first support means; and second crops grow in the second media carrier above the first media carrier fed by the second nutrient supply means and trained by the second support means.

BRIEF DESCRIPTION OF THE SEVERAL VIEWS OF THE DRAWING

FIG. 18AA is a perspective enlarged detailed view of an alternative regulating mechanism.

DETAILED DESCRIPTION OF THE INVENTION

A greenhouse space is divided into a plurality of parallel planting rows separated by walkways. Each planting row forms a functional unit of a greenhouse production system. The following description is focused on this functional unit of the production system.

Figure 1:
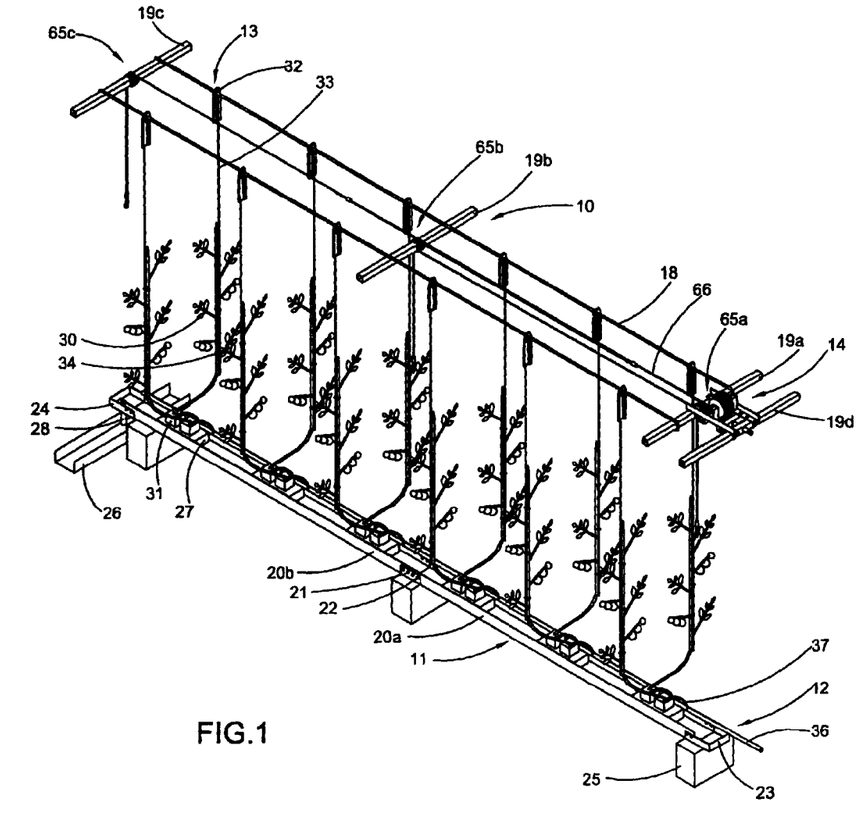
FIG. 1 is a perspective view of a first single crop growing mode and an apparatus of an inventive method and apparatus for growing vine crops in a greenhouse.
Figure 2:
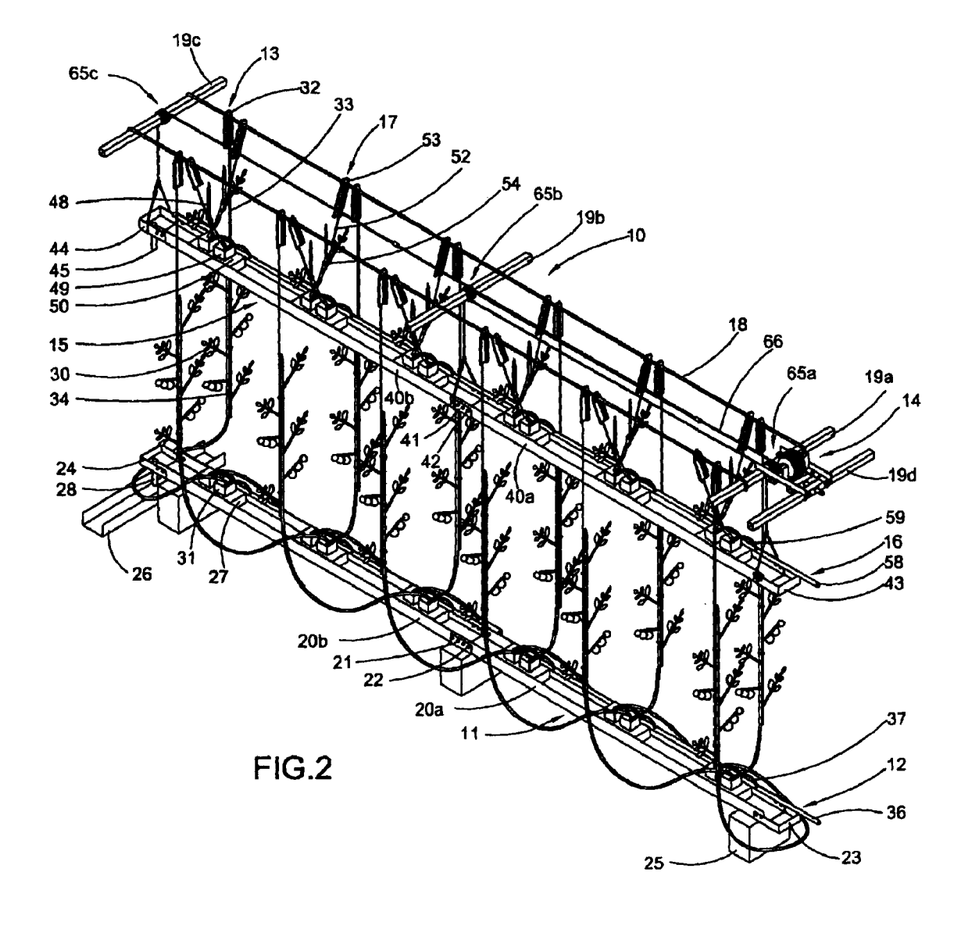
FIG. 2 is a perspective view of an initial stage of a vertical dual crop growing mode and an apparatus of an inventive method and apparatus for growing vine crops in a greenhouse.
Figure 10:
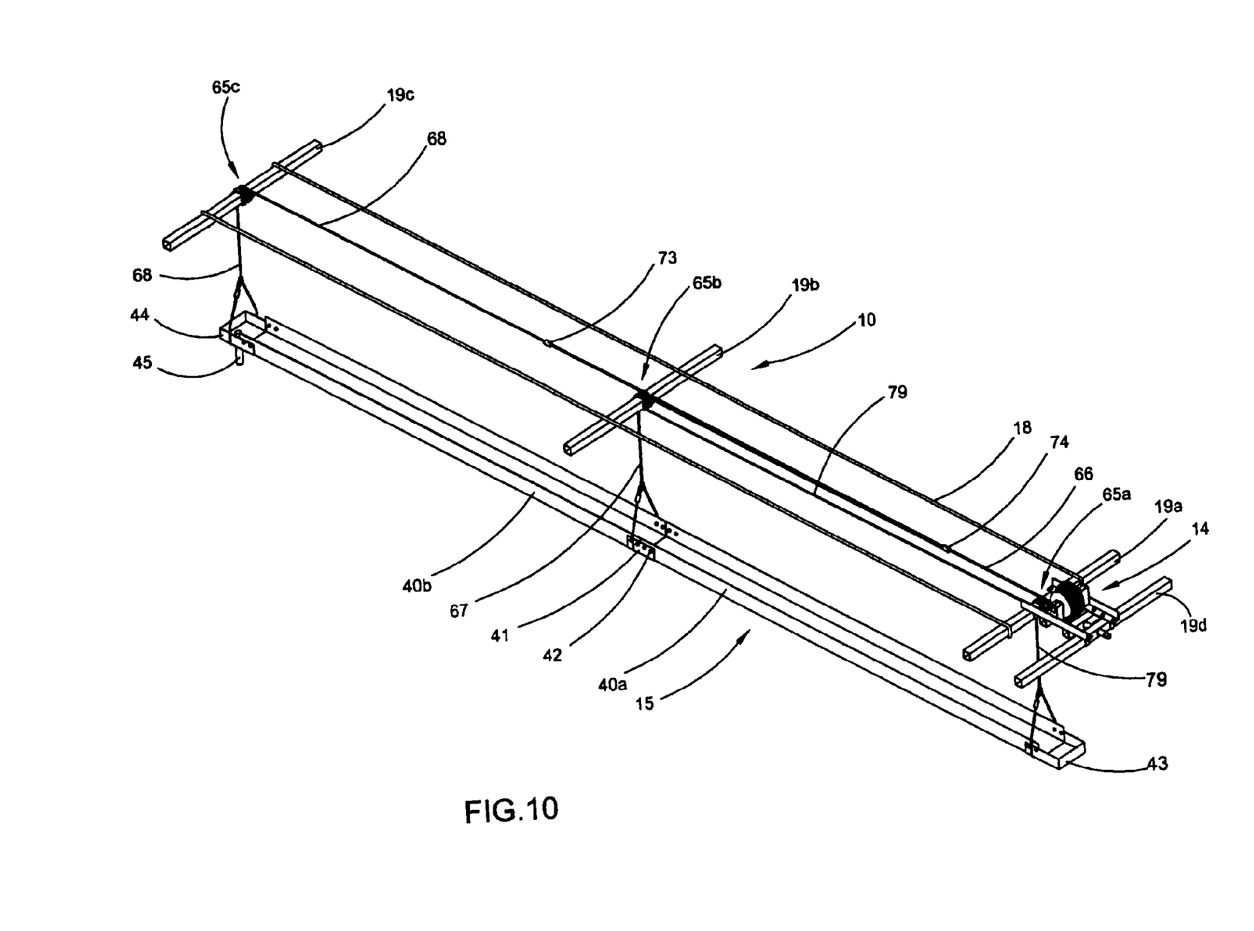
FIG. 10 is a perspective view of an apparatus for growing crops in a greenhouse.

As shown in FIG. 1, FIG. 2 and FIG. 10, an apparatus for growing vine crops comprises an overhead frame structure 10, a first media carrier 11, a first nutrient supply means 12, a first support means 13, a regulating mechanism 14, a main cable 66, a plurality of load differential mechanisms 65a, 65b, and 65c, a second media carrier 15, a second nutrient supply means 16, and a second support means 17.

As shown in FIG. 1, FIG. 2 and FIG. 10, overhead frame structure 10, which can be part of the greenhouse structure, has an array of overhead beams 19a, 19b, 19c and 19d supported by posts (not shown) on the ground (not shown); and a pair of wires 18 supported by the overhead beams. Overhead frame structure 10 is about 10–15 feet above the ground in most cases.

As shown in FIG. 1 and FIG. 2, first media carrier 11 has a pair of gutters 20a and 20b joined together by a bracket 21 using bolts 22. First media carrier 11 also has a first end cover 23 to close one end of the combination of gutters 20a and 20b, and a second end cover 24 to close the other end of the combination. Second end cover 24 has an outlet 28 operationally connected to a catchment 26, which functions as a return route for over-supplied nutrient solution. Both gutters 20a and 20b are elongated structures with a U shaped cross section. Alternatively, the gutters can have a cross section such as n, m, v, w, and the like. The gutters can be made out of any structural material such as metal, plastic, wood, steel, aluminum, fiber glass, and the like. First media carrier 11 can be made longer or shorter by joining different number of gutters together. In most commercial applications, the first media carrier can be as long as 300 feet and may weigh about 8000 pounds when fully loaded. Preferably, first media carrier 11 has the end with outlet 28 slightly lower than the other end to allow over-supplied nutrient solution to flow to outlet 28 to be collected. When over-supplied nutrient solution exists, and is a concern, sealing gaskets or sealing adhesive can be applied at all joints of the gutters. Alternatively, a plastic liner can be laid inside of the gutters to seal the joints.

Figure 13:
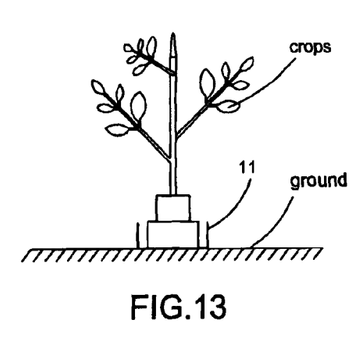
FIG. 13 is a cross sectional view of another alternative means for supporting a media carrier.

As shown in FIG. 1 and FIG. 2, first media carrier 11 is above the ground supported by stands 25 on the ground. As an alternative, shown in FIG. 12, first media carrier 11 can be hung in place by a plurality of hangers 90 from overhead frame structure 10. First media carrier 11 can also be placed on the ground as shown in FIG. 13.

Figure 14:
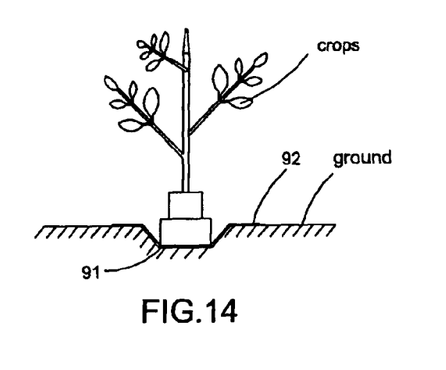
FIG. 14 is a cross sectional view of an alternative first media carrier.

As shown in FIG. 14, an alternative first media carrier comprises a groove 91 in the ground covered with a plastic sheet 92. In cases where over-supplied nutrient solution is not a concern, the ground without a groove is enough and a plastic sheet is not necessary.

As shown in FIG. 1 and FIG. 2, first crops 30 with their own small rockwool blocks 31 are planted on first growing media 27. The stems of first crops 30 are trained by first support means 13. First crops 30 are fed nutrient solution by first nutrient supply means 12.

Figure 3:
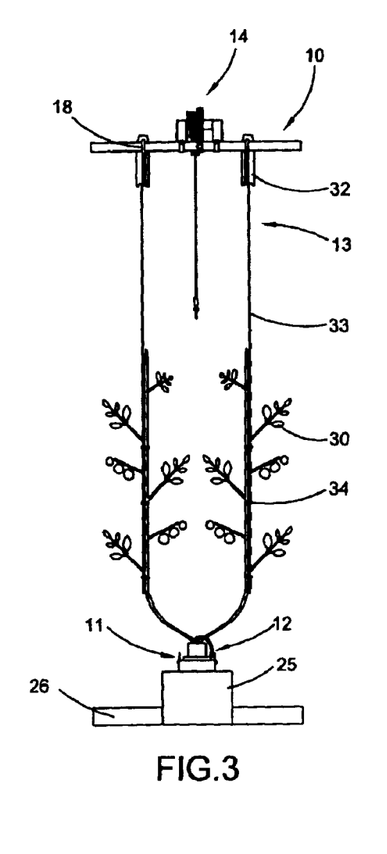
FIG. 3 is an end view of a first single crop growing mode.

As shown in FIG. 1 and FIG. 3, first support means 13 comprises a plurality of strings 33 hung on wires 18 via holders 32, and a plurality of clips 34 attached to strings 33. The purpose of first support mean 13 is to train the stems of first crops 30. Each holder 32 has a hook which can hang on to, and is operationally attached to, one of wires 18. Strings 33 can be 10–40 feet long depending on the type of, and the cultivar of first crops 30. At the beginning, a portion of string 33 is wound up on its holder 32 in a tomato growing greenhouse. Holder 32 can unwind to release more string as needed. The locations of holders 32 on wires 18 can be changed along wires 18 as needed. Each clip 34 is attached to string 33 at one end, and to the stem of the crop at the other end. Multiple clips 34 are needed as the stem grows longer.

As shown in FIG. 1 and FIG. 2, first nutrient supply means 12 feeds nutrient solution to first growing media 27. First nutrient supply means 12 comprises a main line 36 connected to a nutrient solution source (not shown), and a plurality of dripping lines 37. A nutrient solution return channel is formed by first media carrier 11 which has outlet 28 to return over-supplied nutrient solution to catchment 26.

Dripping lines 37 distribute nutrient solution to the individual plant of first crops 30.

Figures 15, 16, 17:
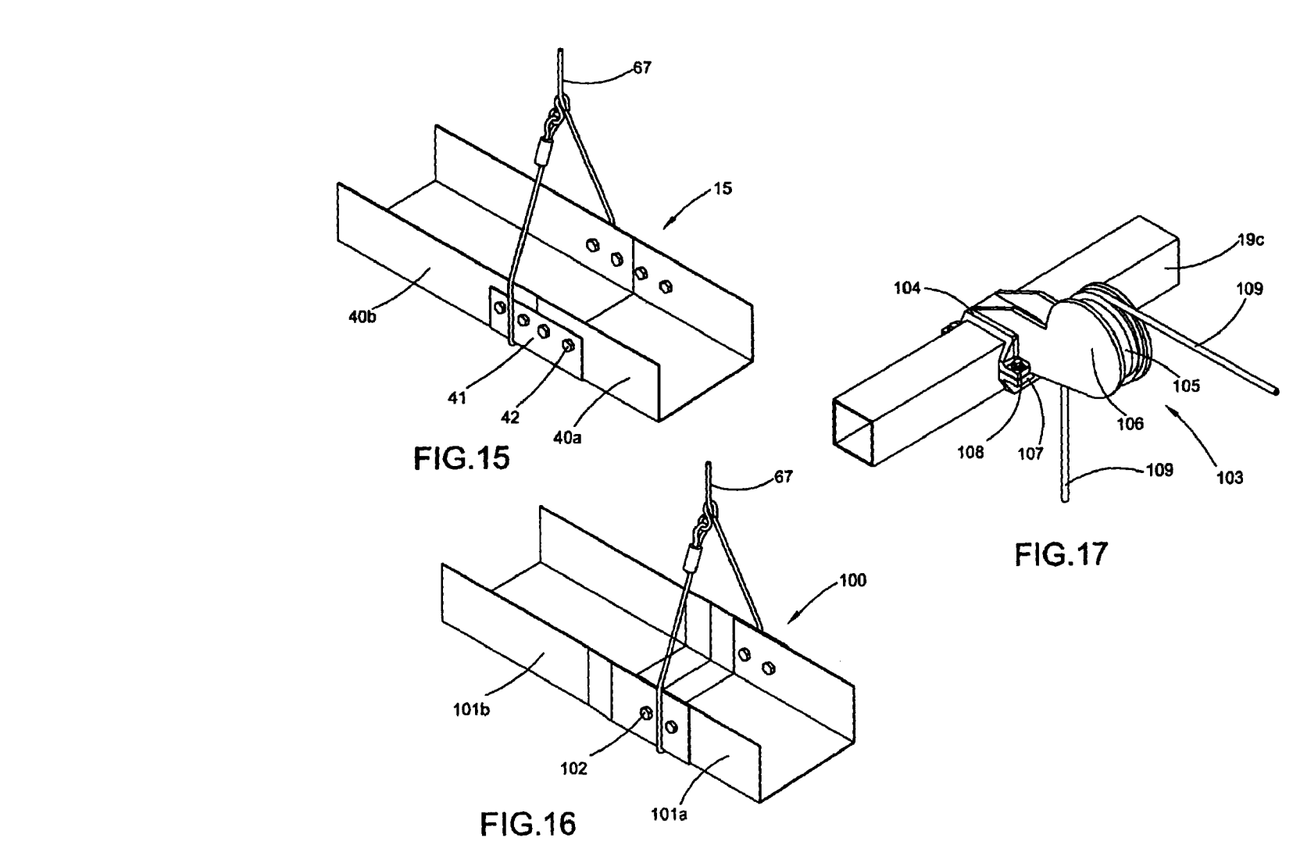
FIG. 15 is a perspective detailed view of a second media carrier.
FIG. 16 is a perspective detailed view of an alternative media carrier.
FIG. 17 is a perspective detailed view of an alternative load differential mechanism.

As shown in FIG. 2, FIG. 10 and detailed in FIG. 15, second media carrier 15 has a pair of gutters 40a and 40b joined together by a bracket 41 using bolts 42. Second media carrier 15 also has a first end cover 43 to close one end of the combination of gutters 40a and 40b, and a second end cover 44 to close the other end of the combination. Second end cover 44 has an outlet 45 operationally connected to catchment 26, which functions as a return route for over-supplied nutrient solution. Both gutters 40a and 40b are elongated structures with a U shaped cross section. Alternatively, the gutters can have a cross section such as n, m, v, w, and the like. The gutters can be made out of any structural material such as metal, plastic, wood, steel, aluminum, fiber glass, and the like. Second media carrier 15 can be made longer or shorter by joining different number of gutters together. In most commercial applications, the second media carrier can be as long as 300 feet and may weigh about 8000 pounds when fully loaded. Preferably second media carrier 15 has the end with outlet 45 slightly lower than the other end to allow over-supplied nutrient solution to flow to outlet 45 to be collected. When over-supplied nutrient solution exists, and is a concern, sealing gaskets or sealing adhesive can be applied at all joints of the gutters. Alternatively, a plastic liner can be laid inside of the gutters to seal the joints.

As shown in FIG. 16, an alternative second media carrier 100 comprises a pair of gutters 101a and 101b joined together by bolts 102. Either gutter 101a or 101b has one end straight and the other end with an enlarged section. The straight end of gutter 101a matches with the enlarged end of gutter 101b. This type of structure can also be applied to the first media carrier.

Second media carrier 15 is above and in substantial parallel with first media carrier 11. The vertical position of second media carrier 15 can be adjusted by regulating mechanism 14.

As shown in FIG. 2, second crops 48 with their own small rockwool blocks 49 are planted on second growing media 50. The stems of second crops 48 are trained by second support means 17. Second crops 48 are fed nutrient solution by second nutrient supply means 16. Second crops 48 can be the same type of crops as first crops 30 or different type.

Figure 4:
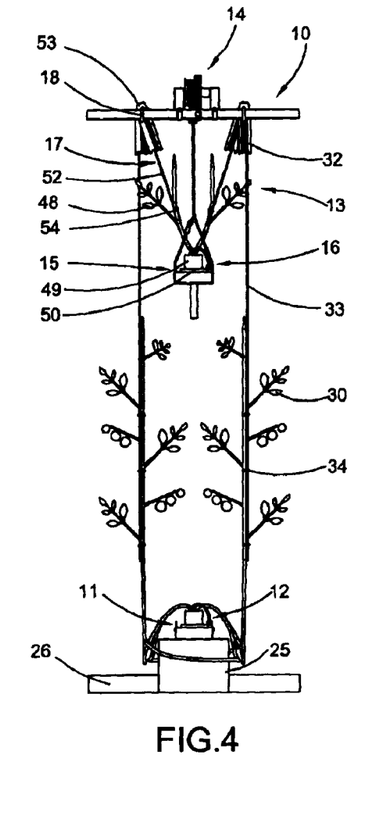
FIG. 4 is an end view of an initial stage of a vertical dual crop growing mode.

As shown in FIG. 2 and FIG. 4, second support means 17 comprises a plurality of strings 52 hung on wires 18 via holders 53, and a plurality of clips 54 attached to strings 52. The purpose of second support means 17 is to train the stems of second crops 48. Each holder 53 has a hook which can hang on to, and is operationally attached to, one of wires 18. Strings 52 can be 10–40 feet long depending on the type of, and the cultivar of second crops 48. At the beginning, a portion of string 52 is wound up on its holder 53 in a tomato growing greenhouse. Holder 53 can unwind to release more string as needed. The locations of holders 53 on wires 18 can be changed along wires 18 as needed. Each clip 54 is attached to string 52 at one end, and to the stem of the second crop at the other end. Multiple clips 54 are needed as the stem grows longer.

As shown in FIG. 2, second nutrient supply means 16 feeds nutrient solution to second growing media 50. Second nutrient supply means 16 comprises a main line 58 connected to a nutrient solution source (not shown), and a plurality of dripping lines 59. A nutrient solution return channel is formed by second media carrier 15 which has outlet 45 to return over-supplied nutrient solution to catchment 26. Dripping lines 59 distribute nutrient solution to the individual plant of second crops 48.

First growing media 27 and second growing media 50 can be slabs, blocks, pots, or bags arranged in a row on the media carrier; or it can be granules or mixtures filling the inside of the media carrier. First growing media 27 and second growing media 50 can be made out of, singularly or in combination: rockwool, perlite, peat, vermiculite, polyurethane (Oasis), polystyrene beads, sawdust, coconut fiber, and the like.

Figures 11, 12:
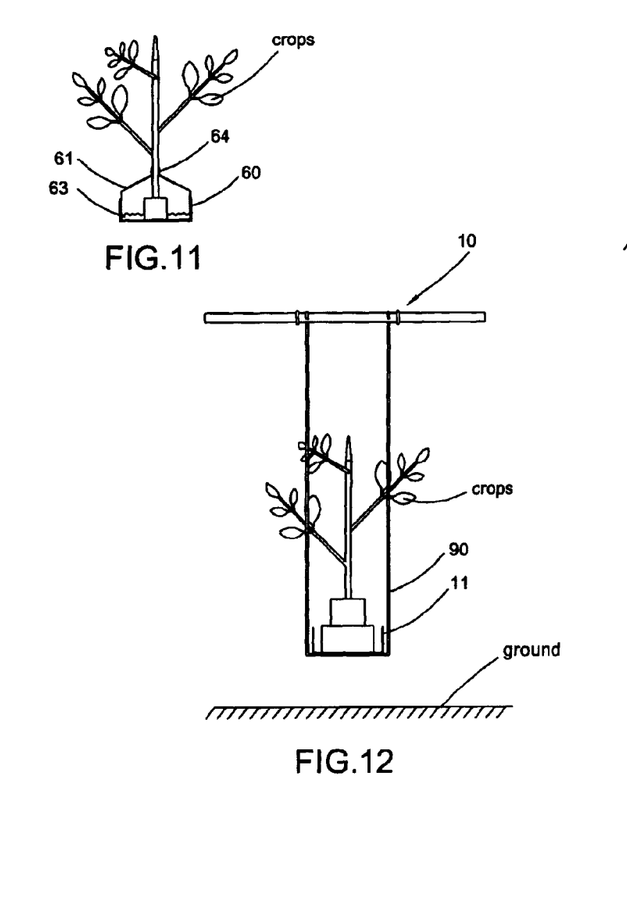
FIG. 11 is a cross sectional view of an NFT as an alternative growing media.
FIG. 12 is a cross sectional view of an alternative means for supporting a media carrier.

An alternative to a combination of a media carrier and growing media is the Nutrient Film Technique (NFT), as shown by a cross section view in FIG. 11. A media carrier 60, having a U shaped cross section, has a plastic liner 61 laid inside to seal it. After crops with their small rockwool block are planted in media carrier 60, plastic liner 61 is folded up and clamped together at the top by clamps 64. Nutrient solution is fed at one end, flows on the bottom of the channel formed by plastic liner 61 as a film 63 to the other end. After that it is collected, refurnished and then pumped back.

Figure 10A:
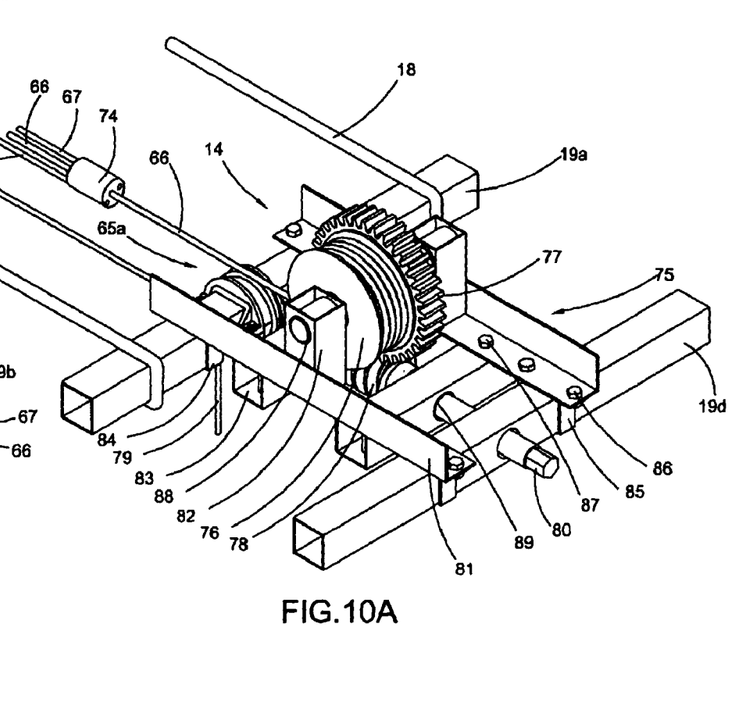
FIG. 10A is a perspective detailed view of a regulating mechanism.
Figure 10B:
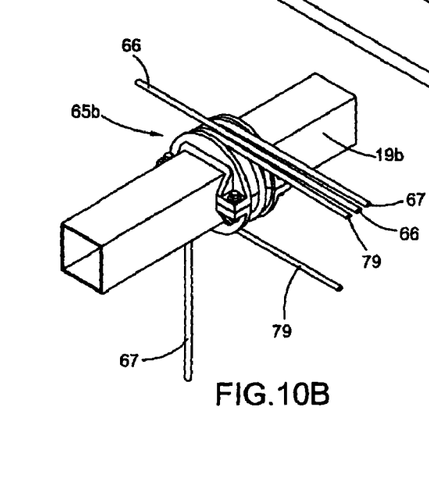
FIG. 10B is a perspective detailed view of a load differential mechanism.
Figure 10C:
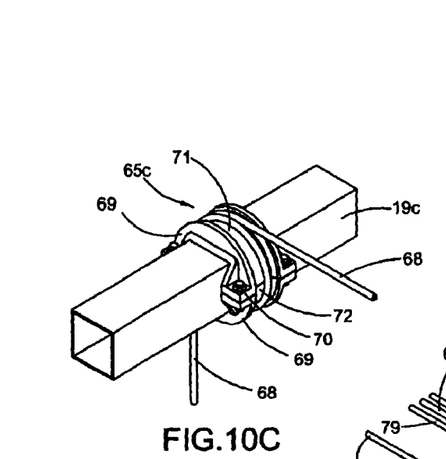
FIG. 10C is a perspective detailed view of a load differential mechanism.

As shown in FIG. 10 and detailed in FIG. 10C, load differential mechanism 65c comprises a cable 68 and a pair of arcuate members 69 clamped together by bolts 70 around overhead beam 19c. Cable 68 winds around arcuate members 69. One end of cable 68 connects to second media carrier 15, and the other end is tied to main cable 66 by a joint 73. Arcuate member 69 is made out of plastic, rubber, steel, aluminum, or the like. Cable 68 is made of steel, cotton, plastic, rubber, or the like. An alternative for cable 68 can be one of, or a combination of any types of elongated flexible structures such as chains, belts, V belts, micro V belts, or wires. Frictional surfaces 71 and 72 on arcuate members 69 engage with cable 68 to transmit the weight load of second media carrier 15 to overhead beam 19c, and to reduce the load transmitted from one end of cable 68 to the other end. As a result, the reaction force at joint 73 between cable 68 and main cable 66 is less than load applied to cable 68 by second media carrier 15. Factors affecting the rate of force reduction between two ends of cable 68 include how many cycles cable 68 winds around arcuate members 69, and coefficient of friction between cable 68 and arcuate members 69. Higher numbers of cycles, or higher coefficient of friction generates higher rate of force reduction.

As shown in FIG. 10 and detailed in FIG. 10A and FIG. 10B, load differential mechanism 65b is clamped around overhead beam 19b. A cable 67 of load differential mechanism 65b has one end connected to second media carrier 15, detailed in FIG. 15, and the other end connected to main cable 66 by a joint 74. As shown in FIG. 10 and detailed in FIG. 10A and FIG. 10B, load differential mechanism 65a is clamped around overhead beam 19a. A cable 79 of load differential mechanism 65a has one end connected to second media carrier 15 and the other end wrapped around load differential mechanism 65b to change direction, then connected to main cable 66 by joint 74. Alternatively, cable 79 of load differential mechanism 65a can have one end connected to second media carrier 15 and the other end directly connected to and wound around regulating mechanism 14 instead of connected to main cable 66 by joint 74.

An alternative load differential mechanism is shown in FIG. 17. A load differential mechanism 103 comprises a cable 109 and a cylindrical member 106 having a mounting bracket 104. Cylindrical member 106 is clamped around overhead beam 19c by a bracket 107 using bolt 108. Cable 109 winds around cylindrical member 106. A frictional surface 105 on cylindrical member 106 engages with cable 109.

As shown in FIG. 10 and detailed in FIG. 10A, regulating mechanism 14 comprises a winch mechanism.

Regulating mechanism 14 comprises a frame 75 affixed to overhead beams 19a and 19d, a drum 76, main cable 66 connected to and wound on drum 76, and a worm gear set formed by a worm gear 77 and a worm 78. Worm gear 77 is affixed to the same shaft as drum 76. The worm gear set features self-locking to prevent drum 76 from rotating due to the weight of second media carrier 15. There is a wrench head 80 on the shaft of worm 78, allowing worm 78 to be turned by a wrench or a power tool. When worm 78 is turned by a wrench, it induces worm gear 77 to turn drum 76 to release or contract main cable 66. When worm 78 is not turned, drum 76 is locked due to the self-locking function of the worm gear set. Frame 75 has a pair of mounting beams 81, a pair of vertical beams 82 which the shaft of drum 76 is journaled to, and a pair of cross beams 83 which the shaft of worm 78 is journaled to. Frame 75 is mounted to overhead beams 19a and 19d by pairs of brackets 84 and 85 using bolts 86. Cross beams 83 are connected to mounting beams 81 by bolts 87. A pair of bushings 88 are used on the shaft of drum 76, and a pair of bushings 89 are used on the shaft of worm 78.

The function of regulating mechanism 14 is to regulate second media carrier 15. By turning worm 78 to release main cable 66 from drum 76, second media carrier 15 is pulled down by its weight.

By turning worm 78 to wind up main cable 66, second media carrier 15 is pulled up against its weight. When there is no turning action on worm 78, second media carrier 15 is held in place by regulating mechanism 14. However, It is not recommended to pull second media carrier 15 up by turning regulating mechanism 14 because the load differential mechanisms make the pulling force needed much larger than the weight of second media carrier 15 except when second media carrier 15 is very light and has no growing media and crops on it.

Main cable 66 is long, and generally in parallel with second media carrier 15. Main cable 66 is connected to the load differential mechanisms at multiple locations. A portion of main cable 66 is considered to be a part of the winch mechanism, and is connected to and wound around drum 76. Main cable 66 is made out of steel, cotton, plastics, rubber, or the like. An alternative of main cable 66 can be one of, or a combination of any types of elongated flexible structures such as chains, belts, V belts, micro V belts, or wires. In cases of using them in a combination, elongated inflexible structures can be included along with at least one elongated flexible structure. Alternatively, more than one main cable can be used, or a main cable can be an extension of the cable of a load differential mechanism.

Figure 18:
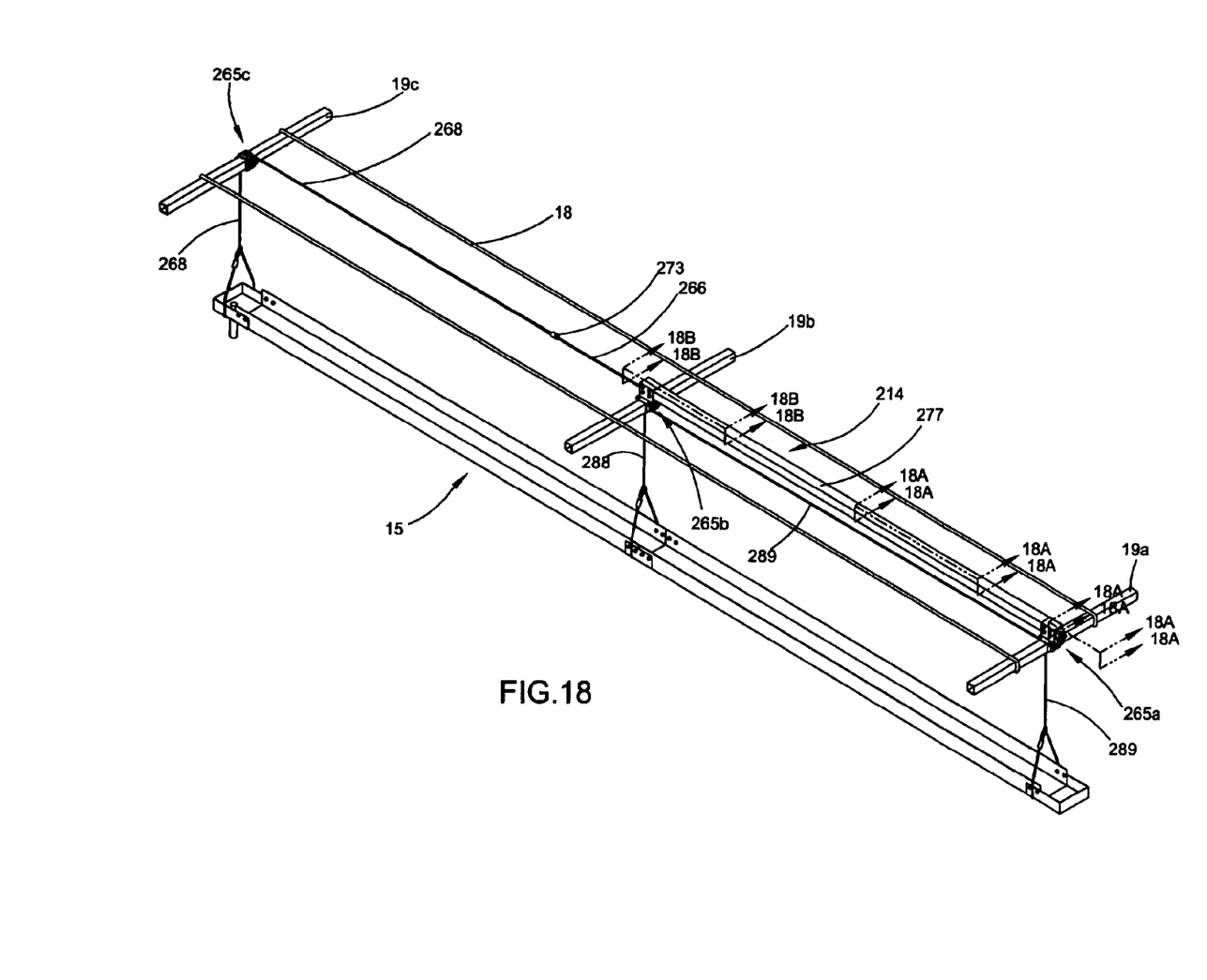
FIG. 18 is a perspective view of an apparatus for growing crops in a greenhouse with an alternative regulating mechanism.

As an alternative shown in FIG. 18, a regulating mechanism 214 comprises a linear screw mechanism.

Figures 18, 18B, 18C:
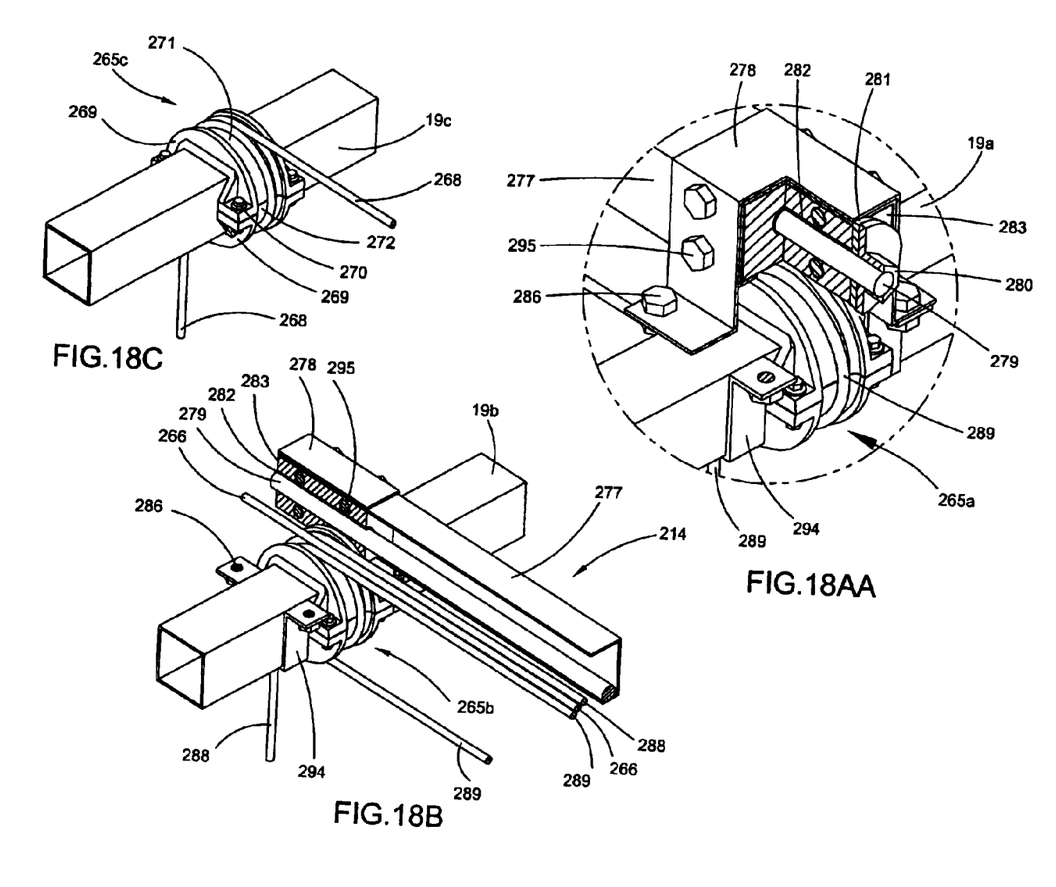
FIG. 18B is another perspective detailed view with cut-sections of an alternative regulating mechanism.
FIG. 18C is a perspective detailed view of a load differential mechanism.

As shown in FIG. 18 and detailed in FIG. 18C, a load differential mechanism 265c comprises a cable 268 and a pair of arcuate members 269 clamped together by bolts 270 around overhead beam 19c. Cable 268 winds around arcuate members 269. One end of cable 268 is connected to second media carrier 15, the other end is connected to a main cable 266 by a joint 273. Frictional surfaces 271 and 272 on arcuate members 269 engage with cable 268 to transmit the weight load of second media carrier 15 to overhead beam 19c, and to reduce the load transmitted from one end of cable 268 to the other end. As a result, the reaction force at joint 273 between cable 268 and main cable 266 is less than load applied to cable 268 by second media carrier 15.

Figure 18A:
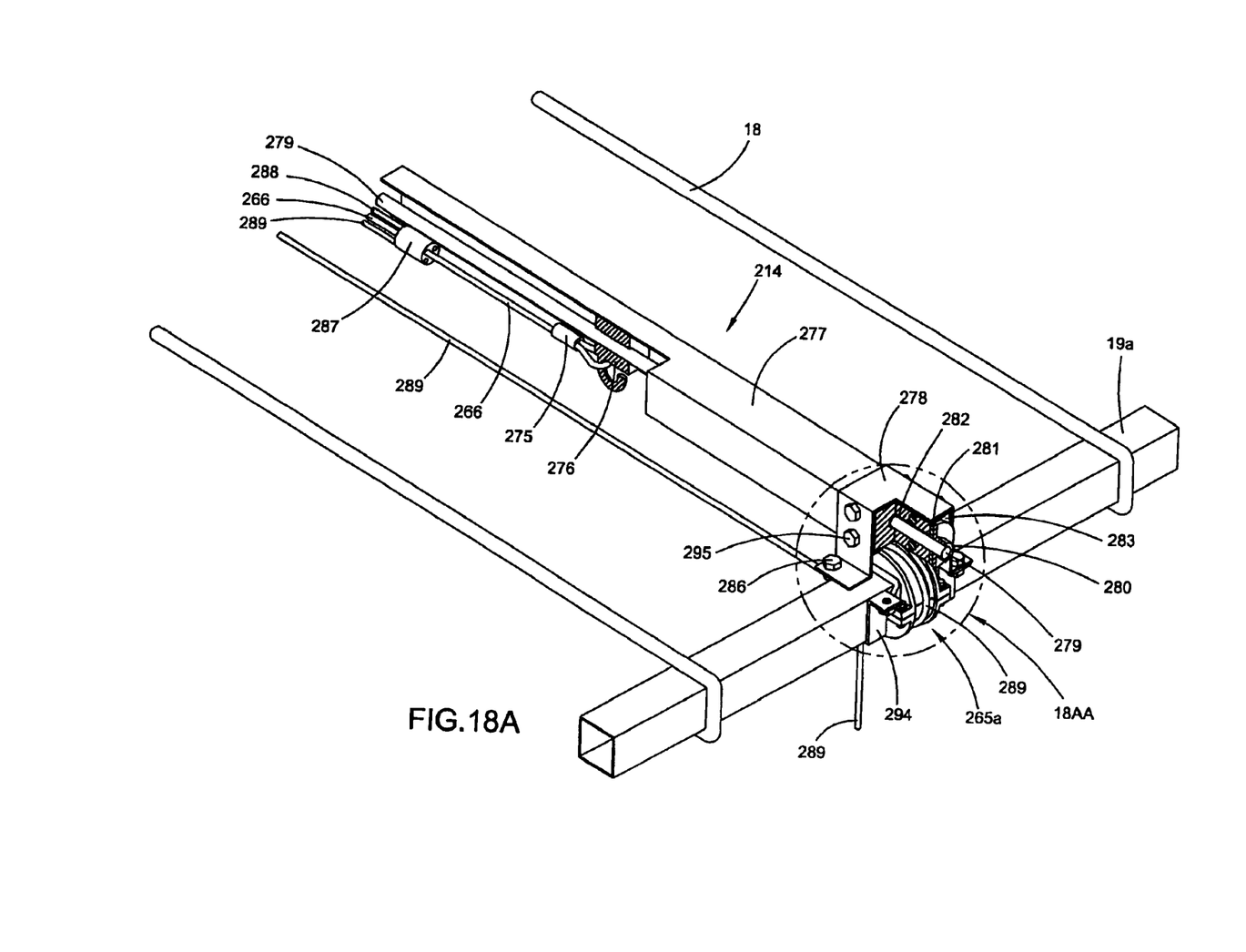
FIG. 18A is a perspective detailed view with cut-sections of an alternative regulating mechanism.

FIG. 18A and FIG. 18B are detailed views with cut sections to show inside of the linear screw mechanism. Areas of cutting are indicated on FIG. 18. As shown in FIG. 18 and detailed in FIG. 18A and FIG. 18B, a load differential mechanism 265b is clamped around overhead beam 19b. A cable 288 of load differential mechanism 265b has one end connecting to second media carrier 15 and the other end connecting to main cable 266 by a joint 287. As an alternative, cable 288 can directly hook onto a nut 276 of regulating mechanism 214.

FIG. 18AA is an enlarged detailed view to show inside of the linear screw mechanism indicated on FIG. 18A by a cycle 18AA. As shown in FIG. 18 and detailed in FIG. 18A and FIG. 18AA, a load differential mechanism 265a is clamped around overhead beam 19a. A cable 289 of load differential mechanism 265a has one end connecting to second media carrier 15 and the other end wrapping around load differential mechanism 265b to change direction, then connecting to main cable 266 by joint 287. As an alternative, cable 289 can directly hook onto nut 276 of regulating mechanism 214.

As shown in FIG. 18 and detailed in FIG. 18A, FIG. 18B and FIG. 18AA, regulating mechanism 214 comprises a frame 277, a threaded rod 279 (thread is not shown), nut 276, a washer 281, a wrench head 280, a pair of blocks 283 and a pair of brackets 278 at the ends of frame 277. Main cable 266 has a ring at the end formed by a joint 275. Nut 276 has a hook which main cable 266 is connected to. Frame 277 is a stud with a C section. Blocks 283 and brackets 278 are jointed to frame 277 at both ends all together by bolts 295. Block 283 has a bore in parallel to frame 277 and holes for bolts 295 in transverse. Frame 277 is clamped to overhead beams 19a and 19b by brackets 278 and mounting brackets 294 using bolts 286. Threaded rod 279 has a pair of sleeves 282 fitted at both ends. Threaded rod 279 is fitted, and is rotatable in the bores of blocks 283. Wrench head 280 is affixed to threaded rod 279 at the end closer to overhead beam 19a, and is able to be turned by a wrench, or a power tool. Washer 281 is between block 283 and wrench head 280. Regulating mechanism 214 features a self-locking function to prevent nut 276 from self-rotating due to the weight of second media carrier 15. Nut 276 slides inside of frame 277 when threaded rod 279 is rotated. Nut 276 moves toward overhead beam 19a when threaded rod 279 is rotated in one direction, and moves toward beam 19b when rotated in the other direction. When threaded rod 279 is not turned, nut 276 is locked due to the self-locking function.

The function of regulating mechanism 214 is to regulate second media carrier 15. By turning threaded rod 279 to move nut 276 along with main cable 266 toward overhead beam 19b, second media carrier 15 is pulled down by its weight. By turning threaded rod 279 to move nut 276 along with main cable 266 toward overhead beam 19a, second media carrier 15 is pulled up against its weight. When there is no turning action on threaded rod 279, second media carrier 15 is held in place by regulating mechanism 214. However, it is not recommended to pull second media carrier 15 up by turning regulating mechanism 214 because the load differential mechanisms make the pulling force needed much larger than the weight of second media carrier 15 except when second media carrier 15 is very light and has no growing media and crops on it.

Main cable 266 is made out of steel, cotton, plastics, rubber, or the like. An alternative of main cable 266 can be one of, or a combination of any types of elongated structures such as chains, belts, V belts, micro V belts, wires, bars, or the like. Alternatively, more than one main cable can be used, or a main cable can be an extension of the cable of a load differential mechanism.

A method for growing vine crops in a greenhouse comprises two growing modes: a single crop growing mode, and a vertical dual crop growing mode. The sequence of this process begins with a first single crop growing mode, followed by a vertical dual crop growing mode, and then followed by a second single crop growing mode. Many horticultural techniques such as training, pruning old leafs, assisting pollination, pruning flower cluster, etc., and harvesting may apply if applicable.

Single Crop Growing Mode:

As shown in FIG. 1 and FIG. 3, the single crop growing mode comprises first crops 30 growing in first media carrier 11. First nutrient supply means 12 feeds water and fertilizer to first crops 30. First crops 30 are trained by first support means 13. It is preferred that at a predetermined time during the growing period of first crops 30, which is usually about 6–7 weeks before harvest ends, the growing point of first crops 30 are pinched off to limit new growth, to limit the height of the crops, and to concentrate nutrition supply to existing fruits and leafs.

Figure 5:
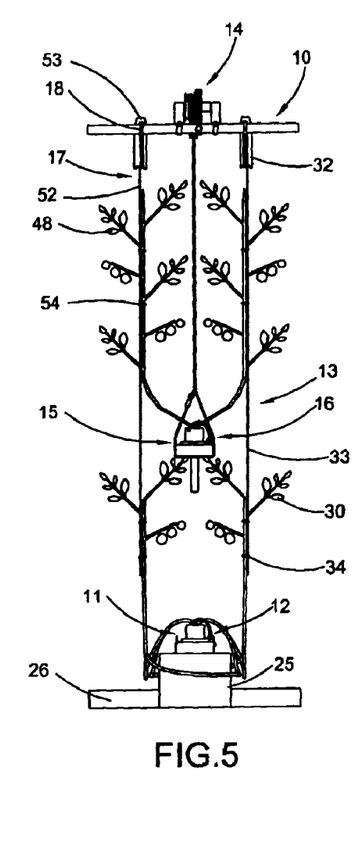
FIG. 5 is an end view of a late stage of a vertical dual crop growing mode.

Vertical Dual Crop Growing Mode:

As shown in FIG. 2, FIG. 4 and FIG. 5, the vertical dual crop growing mode comprises first crops 30 growing in first media carrier 11 and second crops 48 growing in second media carrier 15. First nutrient supply means 12 feeds water and fertilizer to first crops 30. First crops 30 are trained by first support means 13. Second nutrient supply means 16 feeds water and fertilizer to second crops 48. Second crops 48 are trained by second support means 17. Second crops 48 are moved downward periodically by releasing more strings 52 and lowering second media carrier 15 as second crops 48 grow, as shown in FIG. 4 and FIG. 5. Meanwhile if necessary, the tops of first crops 30 are lowered down by releasing more strings 33 and by moving the locations of holders 32 along wires 18 to make room for second media carrier 15 and second crops 48.

Transition between the First Single Crop Growing Mode and the Vertical Dual Crop Growing Mode:

At a predetermined time during the growing period of first crops 30, which is about 6–8 weeks before the harvest ends, cables 68, 67, and 79 are set up in a predetermined position, then second media carrier 15 is set up in place. Second media carrier 15 is some distance away from overhead frame structure 10 to provide room for applying strings 52 to, and for the growth of, second crops 48 before the next lowering down. Second media carrier 15 is preferred to be hung some distance above the tops of first crops 30 in order to provide room for first crops 30 to grow.

Second growing media 50 is put into second media carrier 15. Young second crops 48 with their small rockwool blocks 49 are put on the top of second growing media 50. The stems of second crops 48 are tied to strings 52 for the support necessary for them to stand up. FIG. 4 shows an early stage of the vertical dual crop growing mode after the transition.

FIG. 5 shows a late stage of the vertical dual crop growing mode. First crops 30 are periodically laid down by releasing additional strings 33 from their holders 32, and meanwhile, holders 32 are moved along wires 18 a distance laterally. This effectively lowers the tops of first crops 30 to be in a predetermined distance to overhead frame structure 10. This action results in a lower portion of the stems of first crops 30 laid down laterally besides first media carrier 11.

Second crops 48 are periodically moved downward by releasing more strings 52 and lowering second media carrier 15 as they grow. Second media carrier 15 is lowered by rotating regulating mechanism 14 to release main cable 66. Second media carrier 15 is pulled down by the total weight on it. Second media carrier 15 is lowered down enough to allow second crops 48 to grow before the next lowering down.

Figure 6:
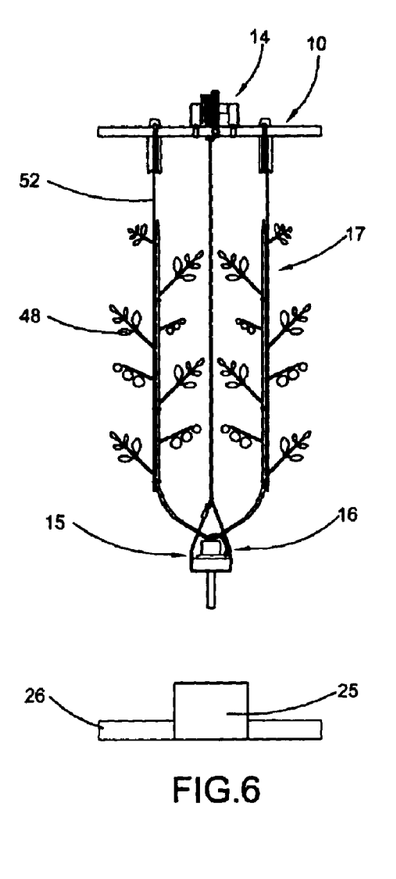
FIG. 6 is an end view of a transitional stage from a vertical dual crop growing mode to a second single crop growing mode.
Figure 7:
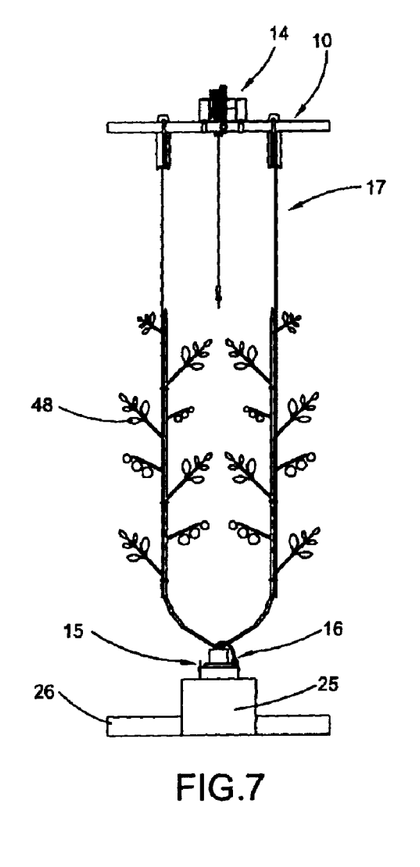
FIG. 7 is an end view of a second single crop growing mode.

Transition between the Vertical Dual Crop Growing Mode and the Second Single Crop Growing Mode:

Refer to FIG. 6, when the final harvest of first crops 30 is finished, the remnants of first crops 30, first growing media 27, first media carrier 11, pipes of first nutrient supply means 12, first support means 13, and any other kinds of wastes are cleaned out, and sterilizing is performed if necessary. Second crops 48 are ready to be lowered to their final position. After strings 52 are released to lower second crops 48, regulating mechanism 14 is rotated to release main cable 66 to make second media carrier 15 reach stands 25, where it sits thereafter. Cables 68, 67, and 79 are detached from second media carrier 15, and rewound up for the next planting cycle. FIG. 7 shows a final position after the transition. Second crops 48 continue to grow thereafter. If desired, after a predetermined time a new dual crop cycle can be started, with the second crops functioning as the first crops of the new cycle.

Figure 8:
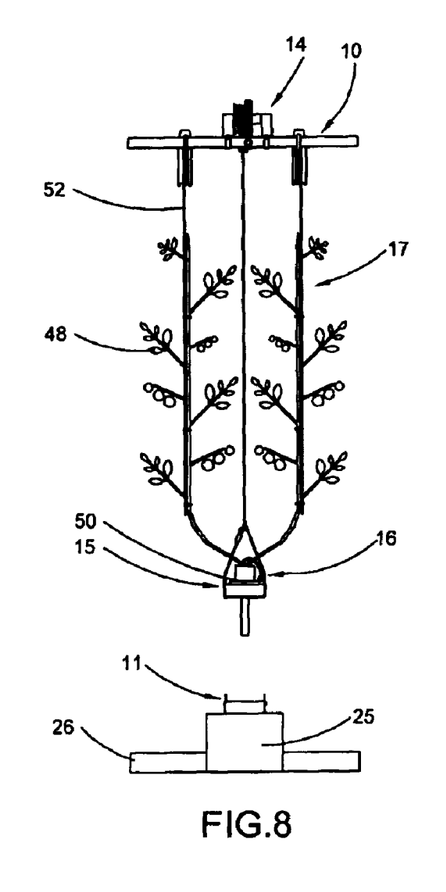
FIG. 8 is an end view of an alternative transitional stage from a vertical dual crop growing mode to a second single crop growing mode.
Figure 9:
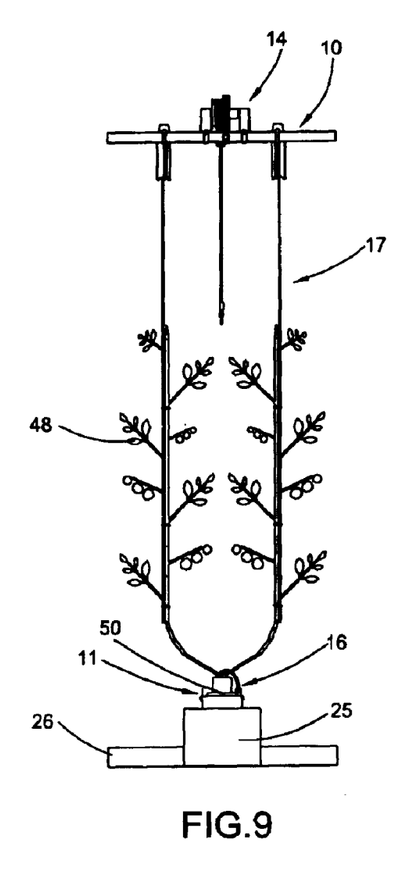
FIG. 9 is an end view of an alternative second single crop growing mode.

An alternative Transition between a Vertical Dual Crop Growing Mode and a Second Single Crop Growing Mode:

Refer to FIG. 8, when final harvest of first crops 30 is finished, the remnants of first crops 30, first growing media 27, and any other kinds of wastes are cleaned out. However, first media carrier 11 remains on stands 25. Sterilizing is performed if necessary. Second crops 48 are ready to be lowered. After strings 52 are released to lower second crops 48, regulating mechanism 14 is rotated to release main cable 66 to make second media carrier 15 reach about the same level as stands 25, where it is in parallel with first media carrier 11. Second crops 48 along with second growing media 50 are removed from second media carrier 15, and are placed into first media carrier 11. Second media carrier 15 is then disassembled into pieces and removed, and cables 68, 67, and 79 are rewound up for next planting cycle. FIG. 9 shows a final position after the transition. Second crops 48 continue to grow in first media carrier 11 thereafter. It is preferred to continually use main line 58 and dripping lines 59 from second nutrient supply means 16. However, it is an alternative option to continually use main line 36 and dripping lines 37 from first nutrient supply means 12 or to continually use the main line but replace the dripping lines with new dripping lines.

Some crops such as peppers and eggplants also need support means. But if a greenhouse is very tall, there is no need to lay down the first crops to make room for the second crops planted above them. They may just need to be inclined to reduce the height of the crops.

Although the description above contains many specifics, these should not be construed as limiting the scope of the invention but as merely providing illustrations of some of the presently preferred embodiment of this invention. For examples, some support means do not use clips, instead, their strings are wound around the stems of the crops. In most cases for peppers and eggplants, because they are much shorter than tomatoes, strings are tied to overhead wires directly without using holders and reserves of strings. As an alternative winch design, additional brake means can be employed to the worm gear set, or other types of gear sets can be used along with brake means. Some crops are short in height or can grow well without support. In such cases, there is no need for support means. Thus the scope of the invention should be determined by the appended claims and their legal equivalents, rather than by the examples given.

We claim:

1. Apparatus for use in a greenhouse having an overhead frame structure and a transparent cover for simultaneously growing two generations of seasonal plants to produce crops comprising:

a first media carrier bearing a first generation of plants and growing media for providing nutrients to said plants;

a second media carrier bearing growing media on which a second generation of plants grow; the second media carrier being located above and substantially parallel to the first media carrier;

a regulating mechanism operatively associated with the overhead frame structure and the second media carrier for controlling and varying the vertical distance between the second media carrier and the first media carrier, at least one elongate flexible load supporting member connected at one end to the regulating mechanism and the other end to the second media carrier; and at least two load differential mechanisms supported by the overhead frame structure; said load differential mechanisms including a drum portion defining a generally cylindrical surface, and a portion of the flexible load supporting member intermediate said ends encircling and engaging the surface of the generally cylindrical drum whereby the regulating mechanism reacts a force in the elongate flexible member that is less than the load applied at the other end of the elongated flexible member by the second media carrier, said load differential mechanisms being responsive to the force at the first end of the load supporting members applied by the regulating mechanism to maintain or selectively lower the second media carrier with respect to the overhead frame structure and the first media carrier thereby allowing variance of the vertical position of the second media carrier with respect to the first media carrier thereby compensating for reduced growth and production of crops by the first generation of plants and facilitating growth and increased production of crops by the second generation of plants.

2. The apparatus as in claim 1, wherein the second media carrier comprises:

at least two elongate, structural members; and at least one joint including bracket assembly connecting the structural members and increasing the length thereof.

3. The apparatus of claim 1 further comprising:

a force generating assist device operatively associated with the regulating mechanism and the first end of the elongate flexible member for decreasing the force in the flexible member for lowering the second media carrier.

4. The apparatus of claim 3 further comprising:

at least one string associated with the first media carrier and the overhead frame structure for guiding and training the growth of a first generation of plants;

a first nutrient supply mechanism for supplying nutrient solution to the first media carrier;

at least one second string associated with the second media carrier and the overhead frame structure for guiding and training the growth of second generation of plants, and a second nutrient supply for supplying nutrient solution to the second generation of plants.

5. Apparatus for use in a greenhouse having an overhead frame structure and a transparent cover for growing seasonal plants to produce crops comprising:

a first media carrier bearing a first generation of plants and growing media for providing nutrients to said plants;

a first nutrient supply for supplying a nutrient solution to the first media carrier;

first plant support strings located between the first media carrier and the overhead frame structure for supporting said first generation plants during growth thereof, a second media carrier bearing growing media on which a second generation of plants grow; the second media carrier being located above and substantially parallel to the first media carrier;

a second nutrient supply for supplying nutrient solution to the second media carrier;

second plant support strings located between the second media carrier and the overhead frame structure for supporting said second generation of plants during growth thereof;

a regulating mechanism operatively associated with the overhead frame structure and the second media carrier for controlling and varying the vertical distance between the second media carrier with respect to said first media carrier, at least one elongate flexible load supporting member connected at one end to the regulating mechanism and the other end to the second media carrier; and at least two load differential mechanisms supported by the overhead frame structure; said load differential mechanisms including a drum having a generally cylindrical portion defining a surface, and a portion of the flexible load supporting member intermediate said ends encircling and engaging the surface of the generally cylindrical drum whereby the regulating mechanism receives and reacts a force that is less than the load applied at the other end of the elongated flexible member by the second media carrier and selectively maintains or reduces the vertical separation of the second media carrier with respect to the overhead frame structure and said first media carrier.

* * * * *